(12) United States Patent
Heinz et al.

(10) Patent No.: US 9,547,547 B2
(45) Date of Patent: Jan. 17, 2017

(54) SYSTEMS AND/OR METHODS FOR HANDLING ERRONEOUS EVENTS IN COMPLEX EVENT PROCESSING (CEP) APPLICATIONS

(71) Applicant: Software AG, Darmstadt (DE)

(72) Inventors: Christoph Heinz, Weimar (DE); Daniel Schaefer, Ober-Moerlen (DE); Michael Cammert, Wettenberg (DE); Tobias Riemenschneider, Schwalmstadt (DE); Juergen Kraemer, Marburg (DE)

(73) Assignee: Software AG, Darmstadt (DE)

( * ) Notice: Subject to any disclaimer, the term of this patent is extended or adjusted under 35 U.S.C. 154(b) by 179 days.

(21) Appl. No.: 14/555,894

(22) Filed: Nov. 28, 2014

(65) Prior Publication Data
US 2016/0154692 A1 Jun. 2, 2016

(51) Int. Cl.
*G06F 11/00* (2006.01)
*G06F 11/07* (2006.01)

(52) U.S. Cl.
CPC ....... *G06F 11/0772* (2013.01); *G06F 11/0709* (2013.01); *G06F 11/079* (2013.01); *G06F 11/0751* (2013.01); *G06F 11/0793* (2013.01)

(58) Field of Classification Search
CPC . G06F 11/0772; G06F 11/0709; G06F 11/079; G06F 11/0751; G06F 11/0793; G06F 11/0781; G06F 11/0769
See application file for complete search history.

(56) References Cited

U.S. PATENT DOCUMENTS

| | | | |
|---|---|---|---|
| 6,556,659 B1 * | 4/2003 | Bowman-Amuah | ... H04L 12/14 370/252 |
| 6,907,375 B2 | 6/2005 | Guggari et al. | |

(Continued)

FOREIGN PATENT DOCUMENTS

| | | |
|---|---|---|
| EP | 2 871 577 | 5/2015 |
| WO | 2013/096651 | 6/2013 |

OTHER PUBLICATIONS

Narayanan, Krishnaprasad et al., Towards Integrated Monitoring and Management of Data Centers using Complex Event Processing Techniques, Mar. 2011, ACM, pp. 1-5.*

(Continued)

*Primary Examiner* — Marc Duncan
(74) *Attorney, Agent, or Firm* — Nixon & Vanderhye PC

(57) ABSTRACT

Certain example embodiments address issues associated with erroneous events produced in Complex Event Processing (CEP) applications. An error handler is controlled to at least: receive, via an event bus, events from external input event sources; receive, via the event bus, error events from an application configured to process events received from the event bus, and to provide to the event bus results obtained from processing received events, and error events corresponding to errors detected at its input and/or processing layer(s); generate, for a given error, an error analysis event and an error impact event by executing a CEP query on at least a corresponding received error event; and provide to the event bus generated error analysis events and generated error impact events. Error analysis events describe for administrators detailed information analyzing corresponding errors. Error impact events describe for business users impacts corresponding errors have for their business user applications.

27 Claims, 8 Drawing Sheets

(56) References Cited

U.S. PATENT DOCUMENTS

| | | | | |
|---|---|---|---|---|
| 7,979,733 | B2* | 7/2011 | Erdtmann | G06F 11/0709 709/224 |
| 8,266,351 | B2 | 9/2012 | Schöning et al. | |
| 8,467,932 | B2* | 6/2013 | Nielsen | G06Q 10/0631 340/576 |
| 8,640,089 | B2 | 1/2014 | Bates et al. | |
| 9,152,487 | B2* | 10/2015 | Estes | G06F 11/0709 |
| 2005/0188273 | A1* | 8/2005 | Angelo | G06F 11/0775 714/39 |
| 2006/0184529 | A1 | 8/2006 | Berg et al. | |
| 2007/0101208 | A1* | 5/2007 | Mohr | G06F 11/0769 714/57 |
| 2008/0168308 | A1 | 7/2008 | Eberbach et al. | |
| 2009/0070786 | A1* | 3/2009 | Alves | G06F 9/541 719/318 |
| 2009/0292729 | A1 | 11/2009 | Blount et al. | |
| 2009/0292818 | A1 | 11/2009 | Blount et al. | |
| 2010/0114621 | A1 | 5/2010 | Salle et al. | |
| 2010/0115348 | A1* | 5/2010 | Gilluwe | G06F 17/30386 714/57 |
| 2010/0287361 | A1 | 11/2010 | Grell et al. | |
| 2011/0029824 | A1 | 2/2011 | Schöler et al. | |
| 2011/0071963 | A1* | 3/2011 | Piovesan | G06Q 10/00 706/11 |
| 2011/0078519 | A1* | 3/2011 | Yordanov | G06F 11/0766 714/57 |
| 2011/0093304 | A1* | 4/2011 | Nielsen | G06Q 10/0631 705/7.12 |
| 2011/0126111 | A1 | 5/2011 | Gill et al. | |
| 2011/0283239 | A1* | 11/2011 | Krishnan | G06F 11/3636 715/853 |
| 2012/0233107 | A1 | 9/2012 | Rösch et al. | |
| 2012/0304007 | A1 | 11/2012 | Hanks et al. | |
| 2012/0310850 | A1* | 12/2012 | Zeng | G06N 5/02 705/317 |
| 2012/0324282 | A1* | 12/2012 | Asad | G06F 11/0793 714/16 |
| 2013/0031282 | A1 | 1/2013 | Amini et al. | |
| 2013/0046725 | A1 | 2/2013 | Cammert et al. | |
| 2013/0151458 | A1 | 6/2013 | Indeck et al. | |
| 2014/0025700 | A1 | 1/2014 | Schöning | |
| 2014/0078163 | A1 | 3/2014 | Cammert et al. | |
| 2014/0237289 | A1* | 8/2014 | de Castro Alves | G06F 11/202 714/11 |
| 2014/0237487 | A1* | 8/2014 | Prasanna | G06F 11/3089 719/318 |
| 2016/0019258 | A1* | 1/2016 | Clark | G06F 11/30 707/766 |

OTHER PUBLICATIONS

Luckham, David C. and Brian Frasca, Complex Event Processing in Distributed Systems, Aug. 1998, Stanford University, pp. 1-28.*
Lajos, Jeno Fulop et al., Survery on Complext Event Processing and Predictive Analytics, Jul. 2010, Nokia, pp. 1-59.*
U.S. Appl. No. 14/458,806, filed Aug. 13, 2014, Cammert et al.
U.S. Appl. No. 14/460,687, filed Nov. 6, 2013, Heinz et al.
Tibco—Using Error Ports and Error Streams, pp. 1-7, retrieved online Nov. 28, 2014. http://docs.streambase.com/sb73/index.jsp?topic=/com.streambase.sb.ide.help/data/html/authoring/errorportsstreams.html.
Sybase—Error Streams, pp. 1-2, retrieved online Nov. 28, 2014. http://infocenter.sybase.com/help/index.jsp?topic=/com.sybase.infocenter.dc01612.0514/doc/html/lar1320541857195.html.
Esper—Chapter 13 EPL Reference: Data Flow, pp. 1-24, retrieved online Nov. 28, 2014. http://esper.codehaus.org/esper-5.0.0/doc/reference/en-US/html/dataflow.html#dataflow-api-exception.
Dan O'Keeffe et al., "Reliable Complex Event Detection for Pervasive Computing," DEBS Jul. 2010, pp. 73-84.
Mahnoosh Kholghi et al., "An Analytical Framework for Data Stream Mining Techniques Based on Challenges and Requirements," vol. 3, No. 3, IJEST Mar. 2011, pp. 2507-2513. http://arxiv.org/ftp/arxiv/papers/1105/1105.1950.pdf.
Guy Sharon et al., "Event Processing Network—A Conceptual Model," VLDB Sep. 2007, pp. 1-9. http://pamsusc.googlecode.com/svn-history/r72/CSCI578/HomeWork/HW1/supplement/sharon.PDF.
Gregor Grambow et al., "Event-Driven Exception Handling for Software Engineering Processes," retrieved online Nov. 28, 2014, pp. 1-12. http://dbis.eprints.uni-ulm.de/744/1/EDBPM11_GOR.pdf.
Mark Palmer, Seven Principles of Effective RFID Data Management, retrieved online Nov. 28, 2014, pp. 1-8. http://rfid.ctu.edu.tw/rueychi/8_lab/RFID_reference/9/7principles_rfid_mgmnt.pdf.
Daniel Gyllstrom et al., "SASE: Complex Event Processing Over Streams," CIDR Jan. 2007, pp. 1-5. http://arxiv.org/ftp/cs/papers/0612/0612128.pdf.
Shawn R. Jeffery et al., "A Pipelined Framework for Online Cleaning of Sensor Data Streams," Report No. UCB/CSD-5-1413, Computer Science Division (EECS) University of California, Sep. 2005, pp. 1-13. http://www.eecs.berkeley.edu/Pubs/TechRpts/2005/CSD-05-1413.pdf.
Shawn R. Jeffery et al., "Declarative Support for Sensor Data Cleaning," retrieved online Nov. 28, 2014, pp. 1-18. http://www.cs.duke.edu/courses/spring07/cps296.1/papers/pervasive06-JefferyAlonsoEtAl-declarative_sensor_cleaning.pdf.
Shen Bin et al., "Research on Data Mining Models for the Internet of Things," retrieved Nov. 28, 2014, pp. 1-6. https://www.ceid.upatras.gr/webpages/faculty/vasilis/Courses/SpatialTemporalDM/Papers/InternetOfThings05476146.pdf.
Thanh Tran et al., "Probabilistic Inference over RFID Streams in Mobile Environments," retrieved online Nov. 28, 2014, pp. 1-12. http://eprints.pascal-network.org/archive/00005581/01/spire-icde09.pdf.
David B. Robins, "Complex Event Processing," Feb. 6, 2010, pp. 1-10. http://www.davidrobins.net/school/UWa/csep504/CSE%20P%20504%20State%20of%20the%20research%201.pdf.
Software AG—WebMethods Error Message Reference, Version 9.7, Oct. 2014, pp. 1-2522.
Software AG—Developing Apama Applications in EPL 5.2.0, Oct. 2014, pp. 1-345.

* cited by examiner

```
<eda:Event xmlns:eda="http://namespaces.softwareag.com/EDA/Event">
 <eda:Header>
  <eda:Type>{http://namespaces.softwareag.com/EDA}ErrorEvent</eda:Type>
  <eda:Start>2014-01-01T14:37:23Z</eda:Start>
  <eda:Kind>Event</eda:Kind>
 </eda:Header>
 <eda:Body>
  <p1:ErrorEvent xmlns:p1="http://namespaces.softwareag.com/EDA">
   <p1:StreamID>FieldSensors</p1:StreamID>
   <p1:EngineID>192.168.1.19:7867</p1:EngineID>
   <p1:ErrorEvent>AK39P,-34.79,374</p1:ErrorEvent>
   <p1:ErrorType>INVALID_DATA_RANGE</p1:ErrorType>
   <p1:ErrorMessage>Attribute 'humidity' with value -34.79 is invalid.</p1:ErrorMessage>
  </p1:ErrorEvent>
 </eda:Body>
</eda:Event>
```

Fig. 3

```
<eda:Event xmlns:eda="http://namespaces.softwareag.com/EDA/Event">
  <eda:Header>
    <eda:Type>{http://namespaces.softwareag.com/EDA}ErrorAnalysis</eda:Type>
    <eda:Start>2014-01-01T14:37:23Z</eda:Start>
    <eda:Kind>Event</eda:Kind>
  </eda:Header>
  <eda:Body>
    <p1:ErrorAnalysis xmlns:p1="http://namespaces.softwareag.com/EDA">
      <p1:StreamID>FieldSensors</p1:StreamID>
      <p1:AnalysisType>SINGLE_DIMENSION_ASSOCIATION_RULE</p1:AnalysisType>
      <p1:Rule>SensorId('AK39P') → Humidity('INVALID_DATA_RANGE')</p1:Rule>
      <p1:Support>17.43%</p1:Support>
      <p1:Confidence>87%</p1:Confidence>
    </p1:ErrorAnalysis>
  </eda:Body>
</eda:Event>
```

Fig. 4

```
<eda:Event xmlns:eda="http://namespaces.softwareag.com/EDA/Event">
  <eda:Header>
    <eda:Type>{http://namespaces.softwareag.com/EDA}ErrorImpact</eda:Type>
    <eda:Start>2014-01-01T14:37:23Z</eda:Start>
    <eda:Kind>Event</eda:Kind>
  </eda:Header>
  <eda:Body>
    <p1:ErrorImpact xmlns:p1="http://namespaces.softwareag.com/EDA">
      <p1:StreamID>AvgTempQuery</p1:StreamID>
      <p1:ErrorEvent>AK39P,-34.79,374</p1:ErrorEvent>
      <p1:ErrorType>INVALID_DATA_RANGE</p1:ErrorType>
      <p1:ErrorMessage>Attribute 'humidity' with value -34.79 is invalid.</p1:ErrorMessage>
      <p1:AffectedComponents>PieChart_3, Table_7</p1:AffectedComponents>
      <p1:Priorities>high,low</p1:Priorities>
    </p1:ErrorImpact>
  </eda:Body>
</eda:Event>
```

Fig. 6

SYSTEMS AND/OR METHODS FOR HANDLING ERRONEOUS EVENTS IN COMPLEX EVENT PROCESSING (CEP) APPLICATIONS

TECHNICAL FIELD

Certain example embodiments described herein relate to techniques for handling erroneous events in Complex Event Processing (CEP) applications. More particularly, certain example embodiments described herein relate to techniques in which error events in CEP streams are captured, processed, and analyzed on-the-fly, and the results of the analysis are forwarded to the business user and to the administrator. For instance, the administrator can use the results for a root cause analysis, and the business user can assess the impact of an erroneous event and rerun analysis tasks for the corrected event.

BACKGROUND AND SUMMARY

Today, companies have to deal with an ever-increasing flood of business-relevant data. Indeed, because of technological advances and high degrees of connectivity, more and more data is being produced on a daily basis. This phenomenon is spread across all industries including, for example, in the financial sector (e.g., where stock tickers report trading activities); in logistics (e.g., where the transport status of goods is continuously reported), in health care systems (e.g., where a variety of sensors reports various measurements), in manufacturing (e.g., in connection with production lanes that are equipped with a multitude of status-tracking sensors), etc.

The newly-arising Internet of Things (IoT), with its millions of devices, will increase yet further the volumes of data being produced on a daily basis. The IoT refers generally to the interconnection of devices and services using the Internet. The number of connecting devices emitting information has increased rapidly and is expected to continue increasing significantly. The IoT thus involves the handling of huge, heterogeneous volumes of data.

The amount of data and the frequency with which it is produced is generally so high that it oftentimes is referred to as being a data stream and/or an event stream. It will be appreciated that companies that are able to process and analyze such streams in a timely manner may be able to leverage such intelligence into competitive advantages. For instance, a delayed arrival time of goods can be communicated early, a production error can be quickly detected, an attempt at credit card fraud can be blocked in a timely manner, etc.

Stream processing typically follows the pattern of continuous queries, which may be thought of in some instances as being queries that execute for a potentially indefinite amount of time on data that is generated or changes very rapidly. Such data are called streams, and streams oftentimes comprise events. Such streams often exist in real-world scenarios, e.g., as temperature readings from sensors placed in warehouses or on trucks for logistics purposes, weather data, entrance control systems (where events are generated whenever a person enters or leaves, for instance), etc. Events may include attributes (also sometimes referred to as a payload) such as, for example, the value of temperature readings and metadata (sometimes referred to as a header or header data) such as, for example, creation date, validity period, and quality of the event. Some events may have a data portion and temporal information (e.g., plane LH123 has landed at 4:34 PM). Possible events occurring in an environment typically are schematically described by so-called event types, which in some respects are somewhat comparable to table definitions in relational databases.

Streams may in certain scenarios be organized in channels that in turn are implemented by an event bus. Channels and event types in this sense may be considered orthogonal concepts, e.g., in the sense that events of the same event type might be communicated via different channels. In some implementations an event bus may be thought of as a central bus for all event streams within an Event-Driven Architecture (EDA). An EDA generally is an architecture that captures the production and consumption of event streams and the reactions to those events. Components within an EDA may be designed to process events in an event-driven manner, e.g., directly when the event arrives. In this regard, in some scenarios, publishers can connect their streams to the bus so that the events are published on it, and subscribers can subscribe to the producer streams made available on the bus.

One aspect associated with the successful handling of event streams relates to adequate information technology (IT) support. Traditional database and data warehouse technology is not always powerful enough and is not necessarily designed to deal with these amounts of data. Thus, it may be necessary or desirable to extend the processing capabilities of companies so that their applications are able to support the real-time processing of event streams.

Complex Event Processing (CEP) is an approach to handling the challenges associated with processing and analyzing huge amounts of data arriving with high frequencies. As will be appreciated from the above, in this context, the arriving data is classified as an event stream. By processing the incoming events in main memory using sophisticated online algorithms, CEP systems can cope with very high data volumes (e.g., in the range of hundreds of thousands events per second) being processed and analyzed appropriately. CEP systems are designed to receive multiple streams of events and analyze them in an incremental manner with very low (e.g., near-zero) latency. Events may be evaluated and aggregated to form derived (or complex) events (e.g., by an engine or so-called event processing agents). Event processing agents can be cascaded such that, for example, the output of one event processing agent can be the input of another event processing agent. In other words, while the data is streaming in, it may be analyzed on-the-fly, and corresponding analytical results may be forwarded to subsequent consumers. Therefore, a CEP system need not necessarily persist the data it is processing. This is advantageous, because an event stream oftentimes is characterized by high volumes and high rates and therefore cannot be persisted.

Thus, CEP in general may be thought of as a processing paradigm that describes the incremental, on-the-fly processing of event streams, typically in connection with continuous queries that are continuously evaluated over event streams. Moreover, CEP analysis techniques may include, for example, the ability to perform continuous queries, identify time-based relations between events by applying windowing (e.g., through XQuery or SQL), etc., with the aid of processing resources such as at least one processor and a memory. See, for example, U.S. Pat. Nos. 8,640,089 and 8,266,351, as well as U.S. Publication Nos. 2014/0078163, 2014/0025700, and 2013/0046725, the entire contents of each of which are hereby incorporated herein by reference.

With CEP technology, relevant data can be extracted in time so that business applications operating on top of that technology can present analysis results with minimum latency to the user. A CEP-supported application can be connected to several event sources that continuously produce events, and such events can be analyzed and condensed by CEP analysis logic. The analysis results can be rendered for the business user (i.e., a user from a business unit, as opposed to a user from the entity's IT department, who is able to leverage dedicated business user applications that present business-relevant metrics) in a report, graphical user interface, and/or other medium.

One issue that arises in CEP-based applications relates to erroneous events. An event source might produce an erroneous event for any number of reasons such as, for example, communication problems, defective sensors, invalid data ranges, etc. For example, a temperature sensor may be defective and, thus, one of its generated events may have a value of "N/A" for its temperature attribute (e.g., as opposed to an expected numeric value). Erroneous events such as these typically cannot be processed adequately. But such erroneous events still might comprise relevant information. For instance, even though the temperature attribute value is faulty, the humidity attribute of the event may be correct. Problems thus may occur on the source layer. However, it also will be appreciated that errors might be thrown during query processing. For instance, an error might be thrown during query processing in response to a number overflow, division by zero, etc.

A question that arises relates to dealing with those errors, as the user consuming the results of the stream analysis oftentimes is not aware of them. Because the user is not necessarily aware of the errors, the user may base decisions on an incomplete and/or inaccurate data base. A resulting error might involve a business process being stopped, even though it might not be necessary or desirable to do so. As a result, the question might be thought of as follows: Given a CEP application whose underlying event sources produce erroneous events, how can the application be adapted so that the errors are properly handled and communicated to the business user?

Another question that arises relates to how the number of error events being produced can be reduced, or even completely avoided. Similar to the above, a potential complication is that the CEP administrator in charge of the CEP application might not be directly aware of the error events. And even if the administrator is aware of them, it could be difficult to find the root cause of the errors.

Because of the demanding requirements of Complex Event Processing, the proper handling of erroneous events can be even more challenging. The amount of errors and the frequency with which they arrive can be very high. Given the oftentimes time-critical nature of CEP applications, it would be desirable (and possibly even necessary) to handle such errors in a timely manner, and traditional technologies for cleaning static data cannot always be applied directly.

The preprocessing of data is a well-established step in data analysis. It typically comprises steps like data cleaning, data integration, as well as data transformation. Many different techniques exist for improving the quality of data. For example, there are techniques for dealing with missing values, removing noise in the data, and normalizing data. These steps are used to preprocess the data before mining and knowledge discovery algorithms are applied. The data being analyzed is typically static and can be traversed multiple times. Unfortunately, however, data preprocessing is typically designed for static data sets, and not for high-volume event streams that are analyzed on-the-fly. Moreover, even if data is preprocessed, errors nonetheless may still appear.

A manual approach could be used for error handling in the CEP context. Indeed, a CEP engine typically logs erroneous events in a log file. The user can explore that log file for errors and manually try to derive the impact of those errors on the application and the decisions. The administrator additionally or alternatively can investigate the log file and try to derive the characteristics of the error events, e.g., to conduct a root cause analysis. Unfortunately, however, the manual approach is very time-consuming and error-prone. There is a high risk that the business user will not check the log file often enough and therefore might not be able to revise a decision that already has been made based on incomplete and/or inaccurate data. Similarly, an administrator trying to perform a root cause analysis of the error may have to be skilled in analytics and data mining in order to uncover the real issues. These activities might take too long and/or come too late.

Another possible solution relates to the data warehouse approach. When errors in Complex Event Processing applications occur, they can be captured and stored in a data warehouse. Data warehouses typically comprise standard cleaning algorithms. This functionality can be used the clean the error events, which afterwards can be republished into the CEP application. Unfortunately, however, the data warehouse approach is not a suitable alternative because of common performance restrictions. For instance, data warehouses are not designed to deal with high data volumes and running analysis on-the-fly. CEP applications typically have a time-critical nature and, therefore, errors that occur also may need to be processed in a timely manner. Additionally, this approach does not include a proper handling of the error events so that the business user and the administrator are aware of the consequences.

The functionality for error handling of some commercially available CEP engines also does not fully address the issues identified herein. In general, these engines establish a kind of channel or listener to which errors are forwarded. It then is up to the user to define and implement corresponding follow-up logic. In essence, this is merely the starting point for an elaborated handling of error events.

In view of the foregoing, it will be appreciated that it would be desirable to overcome these and/or other problems. For instance, it will be appreciated that it would be desirable to address in an intelligent way issues associated with erroneous events that are produced in CEP applications.

Certain example embodiments help address these and/or other needs. For instance, certain example embodiments help address in an intelligent way issues associated with erroneous events that are produced in CEP applications, e.g., in connection with an error handler for event sources. The error handler of certain example embodiments captures error events, processes them, and analyzes their impact on follow-up applications. Additionally, it derives the characteristics underlying the error. Using the results of the error handler, the business user is automatically provided with a notification of relevant errors, along with suggestions regarding how to deal with them. The CEP administrator is provided with a model of the error characteristics so that root cause analysis can be performed.

One aspect of certain example embodiments relates to techniques in which error events are captured during runtime, the stream of errors are processed and analyzed on-the-fly, and the results are forwarded to the business user and to the administrator. With respect to the latter, the administrator can use the results for a root cause analysis, and the business user can assess the impact of an erroneous event and rerun analysis tasks for the corrected event. In other words, in certain example embodiments, erroneous events of arbitrary streams are detected and analyzed appropriately, e.g., so that business users can assess the errors' impacts and so that administrators can reveal the sources of the occurring errors. Statistical methods and mining technologies may be used to derive a model of the error characteristics, which can be used for a sophisticated root cause analysis.

Another aspect of certain example embodiments relates to enabling impact analysis of erroneous events for business users. In this regard, the error handler of certain example embodiments continuously analyzes the error events with respect to their impacts on the information to which the business user has subscribed. If the business user is affected, the error is immediately reported to the user, along with details on the impact. The user can correct/adapt the event and rerun corresponding analysis logic. This allows the user to evaluate the impact of the error and run corrective actions based on the new insights. In order to let the user concentrate on the most important facts and limit the number of error corrections, the user can additionally define the priorities with which error events are presented.

Another aspect of certain example embodiments relates to generating models for root cause analysis of erroneous events for administrators. In this regard, the error handler of certain example embodiments automatically runs analysis tasks over the stream of error events. These analysis tasks are designed to detect the circumstances under which error events occur. The administrator can use this information to estimate future error events, as well as to examine the root cause of the errors. In order to enable the administrator to quickly resolve errors, the error handler of certain example embodiments continuously derives those error characteristics and reports them to the administrator. Again, the results can be prioritized so that the administrator can concentrate on the most important errors.

Another aspect of certain example embodiments relates to enabling efficient analysis of erroneous events. The error stream can produce high volumes of erroneous events in a continuous manner. Therefore, processing and analyzing them may become challenging. Additionally, the business user and the administrator are to be informed immediately in case of serious errors. For that reason, the error handler of certain example embodiments internally leverages a CEP engine for analyzing the stream of erroneous events and reporting the analysis results.

In certain example embodiments, there is provided a computing system comprising processing resources including at least one processor and a memory. An event bus is configured to receive events from a plurality of external input event sources. An application includes input, processing, and output layers. The application is configured to process events received from the event bus, and to provide to the event bus (a) results obtained from processing received events, and (b) error events corresponding to errors detected at the input layer and/or the processing layer. An error handler, under control of the processing resources, is configured to: receive, via the event bus, events from the plurality of external input event sources; receive, via the event bus, error events from the application; generate, for a given error, an error analysis event and an error impact event by executing a CEP query on at least a corresponding received error event; and provide to the event bus generated error analysis events and generated error impact events. Generated error analysis events describe for an administrator detailed information analyzing the corresponding errors, and/or generated error impact events describe for a non-technical user impacts the corresponding errors have for a user application used by the non-technical user. The administrator and the non-technical user are different parties, and generated error analysis events and generated error impact events differ from one another in both structure and content.

In certain example embodiments, there is provided a method of handling errors in a computing system. The method comprises, at an error handler under control of processing resources including at least one processor and a memory: receiving, via an event bus, events from a plurality of input event sources external to the error handler; receiving, via the event bus, error events from an application that includes input, processing, and output layers, the application being configured to process events received from the event bus, and to provide to the event bus (a) results obtained from processing received events, and (b) error events corresponding to errors detected at the input layer and/or the processing layer; generating, for a given error, an error analysis event and an error impact event by executing a CEP query on at least a corresponding received error event; and providing to the event bus generated error analysis events and generated error impact events. Generated error analysis events describe for an administrator detailed information analyzing the corresponding errors, and/or generated error impact events describe for a non-technical user impacts the corresponding errors have for a user application used by the non-technical user. The administrator and the non-technical user are different parties, and generated error analysis events and generated error impact events differ from one another in both structure and content.

In certain example embodiments, an error handler is provided. It includes processing resources including at least one processor and a memory; and a CEP engine. The processing resources are configured to control the error handler to at least: receive, via an event bus, events from a plurality of input event sources external to the error handler; receive, via the event bus, error events from an application that includes input, processing, and output layers, the application being configured to process events received from the event bus, and to provide to the event bus (a) results obtained from processing received events, and (b) error events corresponding to errors detected at the input layer and/or the processing layer; generate, for a given error, using the CEP engine, an error analysis event and an error impact event by executing a CEP query on at least a corresponding received error event; and provide to the event bus generated error analysis events and generated error impact events. Generated error analysis events describe for an administrator detailed information analyzing the corresponding errors, and/or generated error impact events describe for a non-technical user impacts the corresponding errors have for a user application used by the non-technical user. The administrator and the non-technical user are different parties, and generated error analysis events and generated error impact events differ from one another in both structure and content.

Similarly, non-transitory computer readable storage mediums tangibly storing instructions for performing the above-summarized and/or other approaches also are provided by certain example embodiments, as are corresponding computer programs.

These features, aspects, advantages, and example embodiments may be used separately and/or applied in various combinations to achieve yet further embodiments of this invention.

BRIEF DESCRIPTION OF THE DRAWINGS

These and other features and advantages may be better and more completely understood by reference to the following detailed description of exemplary illustrative embodiments in conjunction with the drawings, of which:

FIG. 3 is an XML-based representation of an error event, according to certain example embodiments;

FIG. 4 is an XML-based representation of an example error analysis event, according to certain example embodiments;

FIG. 6 is an XML-based representation of an example error impact event that the error handler may send to the business user application, according to certain example embodiments;

DETAILED DESCRIPTION

Figure 1:
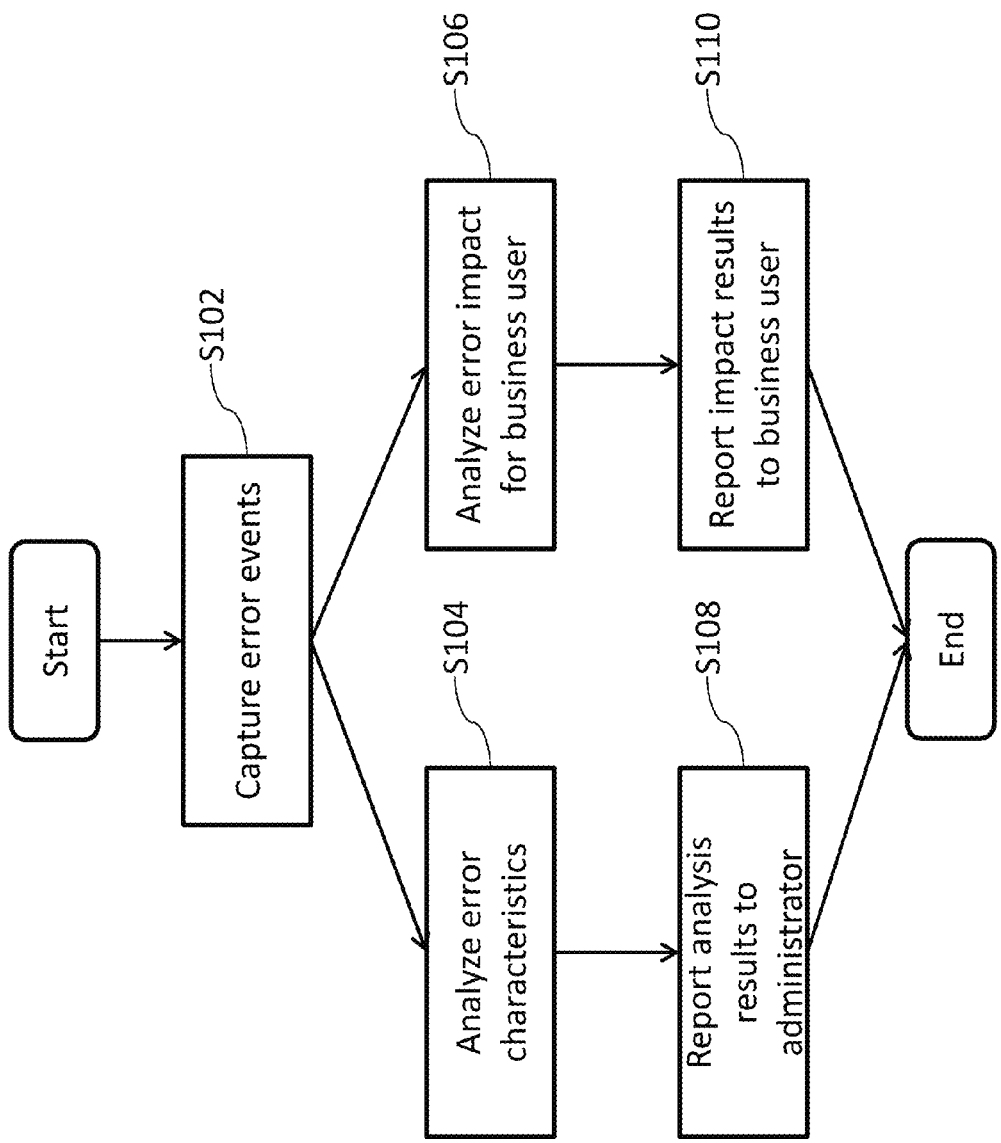
FIG. 1 is a flowchart that illustrates a basic workflow of the error event handling techniques for a business user and a CEP administrator, in accordance with an example embodiment.

Certain example embodiments described herein relate to techniques for handling erroneous events in Complex Event Processing (CEP) applications. A CEP application typically includes three layers, namely, an input layer, a processing layer, and an output layer. The input layer refers to the connection of the CEP engine to event streams. This connection may be established via an event bus, which allows for a flexible connection of event providers and event consumers. This approach can be used to implement an Event-Driven Architecture (EDA) in which participants communicate via events. An event producer produces events that may comprise a data portion and temporal information denoting the time of the occurrence. For example, a temperature sensor may report its identification, its location, the current temperature, and the time of the reading. The CEP engine establishes in its input layer connections to the event streams and receives the incoming events. The engine may normalize the events by converting them into an internal data format used for further processing. At this stage, different errors can occur. For example, the event might not comply with the expected schema of the stream, an attribute may not be parsed, the parsed attribute may not have the expected data type, attributes might be missing, etc. These errors can occur for a number of reasons such as, for example, there being defective sensors, human failures during data input, communication problems, etc. Thus, incoming events can be inaccurate, inconsistent, and/or incomplete, and they therefore may be marked as erroneous. These errors are to be handled appropriately. Provided an event is correct, it is forwarded to the processing layer.

In the processing layer, incoming events are analyzed based on CEP analysis logic. This logic is typically specified in terms of sliding window queries. Such queries may define a referential timeframe for the events to be analyzed, e.g., with the timeframe moving continuously with the event stream. For example, the average transaction volume may be computed continuously with respect to the last 30 minutes. With new events streaming in, this logic is continuously evaluated and therefore produces a continuous stream of output events. A CEP engine may be connected to multiple streams, and multiple queries may be evaluated over them. During query evaluation, errors that have not been detected in the input layer (and/or might not have yet become manifest) can occur. For example, an integer value may be divided by zero, an integrity constraint requiring an attribute to have only positive integer numbers may be violated, an unexpected null value may be present, a user-defined function may throw an exception during processing, a number overflow may occur, etc. As in the input layer, the errors are to be handled appropriately. Provided no error occurs during query processing, the results of the query are forwarded to the output layer. Within an EDA, this may involve publishing the results as events on the event bus. Therefore, in an EDA, a CEP engine may serve as an event consumer and event producer.

In the output layer, the analysis results of the queries are continuously forwarded to follow-up consumers and applications. Erroneous events detected in the input and the processing layers are not necessarily part of the query results, and follow-up applications may not be aware of such errors. These downstream applications often include reports and dashboards that aid in visualizing the results within graphical widgets like pie charts, XY plots, tables, etc. In general, the reports and dashboards are consumed by users from the business division, also called business users. With the advent of mashup software and new reporting software, the business user can customize such reports and dashboards. Receiving the analysis results from the CEP engine, the business user can apply custom transformations and mappings, e.g., including renaming attributes, converting dates into other date formats, aggregating data, etc. Thus, the business user can further condense and modify the CEP results and adapt them to the user's own needs.

In general, the business user will mainly concentrate on the output layer, whereas the administrator from the IT department mainly will concentrate on the input and the processing layer. In typical organizations, the administrator is in charge of the running CEP system and helps ensure that the system runs stable and correctly. These responsibilities may also include investigating erroneous events and the sources of these errors.

Referring now more particularly to the drawings, FIG. 1 is a flowchart that illustrates a basic workflow of the error event handling techniques for a business user and a CEP administrator, in accordance with an example embodiment. The efficient detection and handling of erroneous events is made possible in certain example embodiments through the use of a CEP engine that is equipped with an error handler component. The error handler of certain example embodiments receives events marked in the input layer or in the processing layer as erroneous (step S102). The error handler analyzes the resulting stream of error events in a continuous manner (steps S104 and S106). These analysis tasks are designed to report the error and its consequences to the administrator and the business user (steps S108 and S110).

Sophisticated error analysis for CEP administrators is made possible in certain example embodiments. For instance, the administrator may be presented with an alert for errors, as well as more detailed analysis. The analysis may gather insights into the nature of a detected error, e.g., how often the error occurs, which specific type of error has occurred, whether the error correlates with other events and their values, the likelihood that the error will occur again, etc. To alleviate processing problems, the administrator can use that information to establish, if possible, cleaning steps for the affected streams, e.g., so that error events are converted into valid events (if possible). Additionally, the administrator may be able to use that information to investigate the root causes of the error. If identified, the source generating the event stream and producing the errors may be adjusted so that the likelihood of an error being generated is reduced and/or such that the error is eliminated.

The CEP applications may be connected to multiple event streams and may execute a multitude of queries so that the administrator may face a large volume of error events. In order to allow the administrator to concentrate on the most important ones, the error handler of certain example embodiments may annotate the errors, e.g., to indicate their relative priorities. For instance, a prioritization may be made by examining the relevance of the associated streams for follow-up consumers. For example, errors in a stream of potential credit card fraud attempts may be flagged with a higher prioritization (and thus may receive attention faster) than errors in a stream relating to newly created credit cards.

Error analysis for business users also is made possible in certain example embodiments. Business users oftentimes focus on customized reports and dashboards. If error events occur, the error handler of certain example embodiments checks whether the errors affect such reports and dashboards, e.g., by determining whether the stream producing the errors contributes to them. If that is the case, an error impact event is sent and displayed in the report and the dashboards. This event may provide details on the error and the affected components. The user may be offered the ability to manually correct the event and rerun the corresponding query logic. As a consequence of that "what-if" analysis, the reports and the dashboards are updated so that the corrected event is included in the computation. By doing so, the business user can directly investigate the impact of the erroneous event on the user's decisions. This approach helps ensure that the business user is informed of errors with minimum latency, which can reduce the risk of wrong decisions being made based on incomplete or otherwise inaccurate data. Because many error events may be produced, the business user also may assign priorities to the report and dashboard components. For instance, only error events affecting highly-prioritized components may be reported. Therefore, the business user can concentrate on errors deemed serious (e.g., those errors that might be seen as affecting his/her decisions).

Example Implementation

An example implementation will now be provided. In the following example implementation, techniques for handling erroneous events in CEP applications are presented in connection with an EDA coupled with CEP functionality. Within the EDA, participants communicate via events in an active manner. For instance, each time an event arrives, corresponding subscribers process them and directly forward the results, also as events. A publish/subscribe model, or one of its variants, may be used in this regard. Of course, it will be appreciated that other architectures, messaging protocols, and/or the like, may be used in different example embodiments, and that the following description is made for purposes of illustration only.

Example Error Handler Architecture

Figure 2:
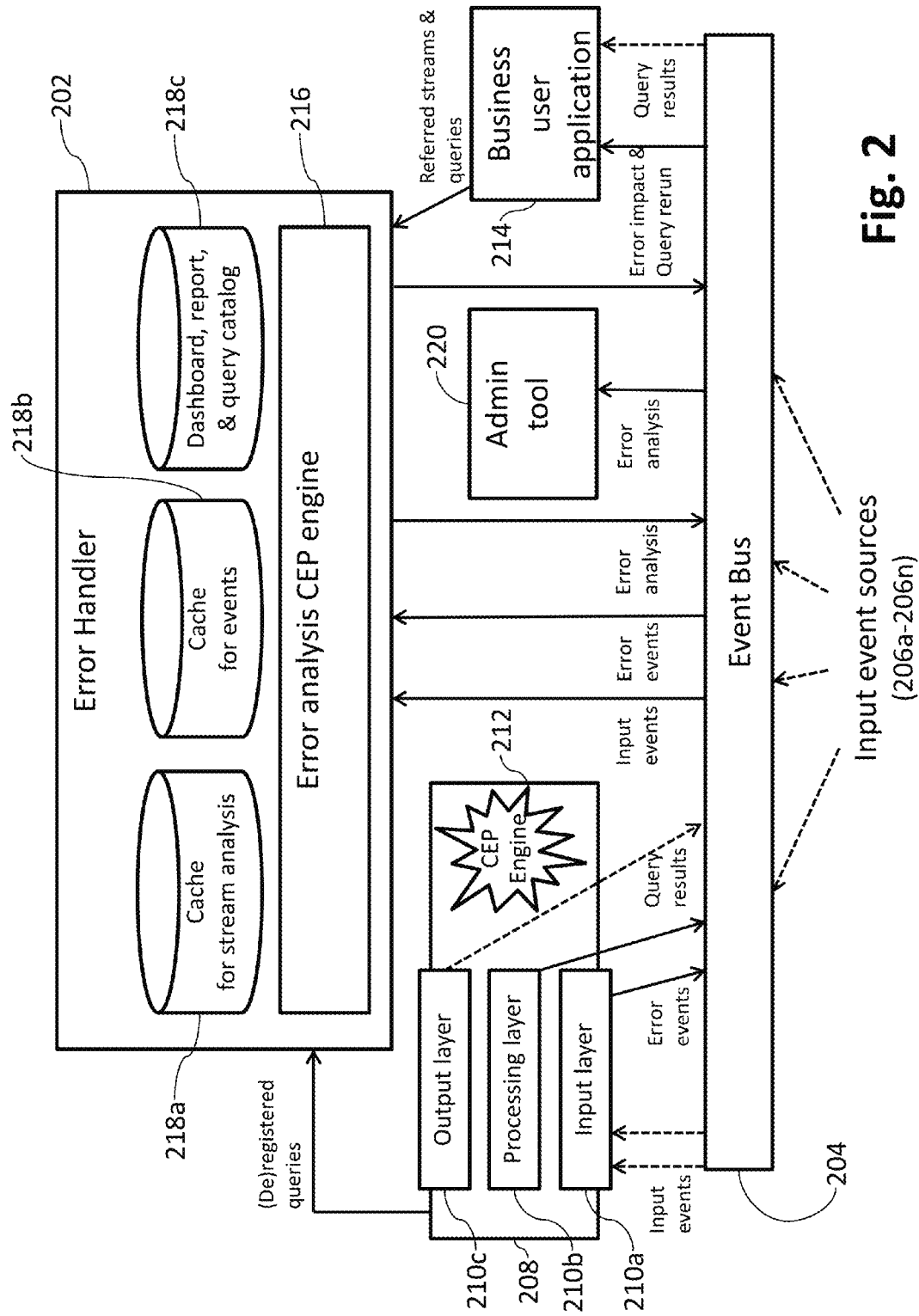
FIG. 2 is a block diagram including an overall architectural view of a processing system that may be used in connection with certain example embodiments.

FIG. 2 is a block diagram including an overall architectural view of a processing system that may be used in connection with certain example embodiments. FIG. 2 provides an architectural overview of the error handler 202, its components, and how they interact with the rest of the example processing system. Based on an EDA, the event bus 204 is the central transport channel for events. More particularly, the event bus 204 is connected to the input event streams 206a-206n upon which the CEP application 208 is based. The CEP application includes an input layer 210a, a processing layer 210b, and an output layer 210c, as well as an internal CEP engine 212. The internal CEP engine 212 cooperates with these layers 210a-210c, e.g., in performing continuous queries on event streams in connection with processing resources such as, for example, at least one processor, memory, a non-transitory computer readable store, and/or the like.

In FIG. 2, the dotted lines indicate the flow of valid events. That is, the dotted lines in FIG. 2 do not include errors. The basic FIG. 2 flow includes a number of operations. For example, the CEP application 208 is subscribed to the input streams and receives the events. The events are analyzed, and the results are published back on the event bus 204. The follow-up business user application 214 can subscribe to the results and render them in reports and dashboards for the business user (e.g., via a computer system connected to the event bus 204, the computer system including its own processing resources, display device, etc.).

The solid lines in FIG. 2 illustrate the workflow for erroneous events. Errors produced in the input layer 210a and the processing layer 210b are published as error events on a dedicated error channel of the event bus 204. The error handler 202 subscribes to that stream and uses an internal CEP engine 216 to analyze the error events on-the-fly. It will be appreciated that the CEP engine 216 may have similar components to those described above in connection with the CEP engine in the application 208. In certain example embodiments, some or all of such components may be shared. The analysis logic for the administrator accesses an internal storage area that stores results of the stream analysis to build up an error knowledge base for the different streams. The internal storage area of the error handler 202 may include a cache for stream analysis 218a, a cache for error events 218b, a dashboard/report/query catalog 218c, and/or the like. The analysis results are published as events on the bus 204 so that an administration tool 220 can subscribe to it and render the results for the administrator (e.g., via a computer system connected to the event bus 204, the computer system including its own processing resources, display device, etc., similar to the above). The analysis logic for the business user maintains the catalog of currently active reports and dashboards 218c so that a check can be made as to whether an error event has an impact on the business user application 214. When the impact analysis for an error is completed, the error handler 202 publishes the results as an event on the event bus 204 so that the business user application 214 can subscribe to it and render the results for the user. If the user manually corrects the error event, the user can rerun the query and check the effects on decisions that have been made. To aid in the rerunning, the error handler 202 may maintain the cache of events 218b required for rerunning the query.

The subsequent sections describe in more detail operations for processing erroneous events.

Example Generation of Error Events

As indicated above, the CEP engine 212 of the application 208 is connected to the input event streams 206a-206n via the event bus 204. When processing incoming events, errors can occur in the input layer 210a and/or in the processing layer 210b. If an error occurs, the CEP engine 212 of the application 208 catches that exception case and handles the erroneous event separately. As a default behavior, the engine 212 of the application 208 may write an error log entry into a log file. It also may generate a new error detail event, e.g., with the original data and details of the error. An error detail event can include the following attributes, which help to summarize the error:

| Attribute | Data Type | Details |
| --- | --- | --- |
| StreamID | String | Unique identifier of the stream that produced the erroneous event. |
| EngineId | String | Unique identifier of the CEP engine where the error occurred. |
| ErrorEvent | String | Event that caused the error, e.g., with its attribute values provided as a comma-separated list. |
| ErrorType | String | Type of the error that occurred, e.g., given a suitable list of error types. |
| ErrorMessage | String | Message of or relating to the error that has been thrown. |
| ErrorTimestamp | Timestamp | System time when the error was thrown. |

FIG. 3 is an XML-based representation of such an error event, according to certain example embodiments. Among other things, FIG. 3 shows an error event indicating that a field sensor produced a humidity value of −34.79, which is invalid because the value is out of range. FIG. 3 also indicates the error was detected by the engine operating at 192.168.1.19:7867, the date and time at which the error was detected, etc.

Once the error detail event has been created, the CEP engine 212 of the application 208 publishes it on the event bus 204. To aid in this behavior, the error handler 202 creates a dedicated error event channel on the event bus 204. The error handler 202 automatically subscribes to that error stream. It will be appreciated that decoupling the error handling from the original engine 212 via the event bus 204 is advantageous in that multi-engine environments can be supported more easily. Such a system environment may host multiple CEP engines, with one central error handler 202 being responsible for the error processing. As alluded to above, an alternative approach is to natively embed the error handler 202 into the CEP engine 212 of the application 208 so that errors are natively passed to the error handler 202. FIG. 2 shows a standalone error handler 202, which is flexible and extensible, but it will be appreciated that the techniques described herein can be adapted to work with an error handler 202 being embedded into a single CEP engine 212 of the application 208.

When an error detail event has been created and published, the error handler 202 receives and analyzes it. The analysis is performed in connection with its internal CEP engine 216. This approach helps ensure that the error handler 202 can cope with large volumes of arising errors, that the analysis results are directly computed and forwarded to follow-up consumers, etc. This aspect is advantageous, in that CEP applications typically require immediate actions in case of problems. Therefore, errors are analyzed in an online manner in order to help reduce the risk of decisions being based on incomplete, inaccurate, or otherwise wrong data.

The CEP engine 216 internal to the error handler 202 runs analysis logic for error handling that provides insights for the business user and the administrator.

The following table summarizes different types of errors and events that may be used in connection with certain example embodiments:

| Notation | Description |
| --- | --- |
| Error | The actual error that occurred when processing an incoming event. |
| Error event | The event for which an error has been thrown during processing. |
| Error detail event | The event produced by the original CEP engine, which describes the error in detail. |
| Error analysis event | The event describing the results of the analysis for the administrator. |
| Error impact event | The event describing the impact the error has for a business user application. |

Error Analysis Techniques Assisting the CEP Administrator

The error handler 202 supports the CEP administrator in dealing with erroneous events and their sources, in certain example embodiments. For example, it may try to reveal the characteristics underlying the errors, provide the administrator means to conduct a root cause analysis, etc.

Using simple analysis logic, the error handler 202 can derive basic statistics of the errors and the corresponding sources. The logic can be expressed in terms of sliding window queries, for instance. The following examples illustrate that approach. More particularly, the following examples pose a "plain language" question, and then provide a SQL-like query (e.g., a continuous query) that may be used in actually "asking" the question.

How many errors occurred for each stream in the last hour?
SELECT COUNT(*), StreamID
FROM ErrorStream WINDOW(RANGE 1 HOUR SLIDE 1 HOUR)
GROUP BY StreamID Determine all error events with error type 'IncompatibleDataType'.
SELECT *
FROM ErrorStream
WHERE ErrorType='IncompatibleDataType'

Determine all streams with more than 100 errors in the last hour.
SELECT COUNT(*), StreamId
FROM ErrorStream
GROUP BY StreamID
HAVING COUNT(*)>100

Additional statistics can be derived in a like manner. Such statistics may include, for example, determining all streams where the number of errors has increased by more than 20% per hour in the last five hours; determining the three streams having produced the most errors in the last two hours; determining the error type that has occurred most often in the last hour; determining the CEP engine where the most errors have occurred; detecting when the number of errors per minute rapidly increases; and/or the like.

An advantage of using the CEP engine 212 internal to the application 208 is that an administrator can also write custom logic for detecting and handling errors. This does not only refer to analysis queries for the internal error handling CEP engine. For instance, provided that the CEP administrator has strategies for circumventing errors using the insights from the error analysis, the administrator can also write data correction queries that run on the original CEP engine 212 in the application 208 and clean invalid events before they are processed further. For example, missing values may be interpolated or set to a default value, etc.

Besides this comparably simple logic for deriving error statistics, the error handler 202 may also automatically run more complex analysis tasks. The CEP engine 216 in the error handler 202 may leverage techniques from the area of stream mining. Compared to traditional mining approaches, this has the advantage that the results also may be made available in an online manner.

Stream mining techniques may be used to detect intra-event and inter-event error dependencies in an automated way. For example, the administrator need not necessarily configure and execute such checks. An intra-event error dependency denotes a dependency between an error-free attribute of an event and an erroneous attribute. For example, when the attribute sensorID has the value "AK39P," then the humidity value is negative and thus invalid. Therefore, there is a dependency between sensorID and the faulty attribute humidity; the error source is a faulty sensor with the id "AK39P." An inter-event dependency denotes a dependency between attributes of previous events and an erroneous attribute. For example, when the temperature constantly rises by 10% for more than five readings, than the humidity value becomes invalid. Thus, the sensors cannot cope with sudden temperature increases. Different techniques can be leveraged to detect intra- and inter-event dependencies including, for example, association rules, clustering, classification, forecasting, and/or the like. These mining operations may allow the administrator to gain more insights into the characteristics of the errors and the corresponding sources. The administrator can use this information to conduct a root cause analysis of the errors. In order to let the administrator browse through the results, the error handler 202 may use a cache (or database) as a storage area 218b for the stream analysis results.

The different analysis steps can be incorporated into an internal analysis knowledge base in order to facilitate future handling of errors by proposing actions that have proved their effectiveness in the past. For example, the CEP queries written by an administrator can be stored so that these queries can be later easily adapted to other analysis use cases. The collection of those solution ontologies/templates may be a valuable starting point for an analysis in addition to or apart from the automatic analysis the error handler 202 runs by default.

FIG. 4 is an XML-based representation of an example error analysis event, according to certain example embodiments. FIG. 4 shows an error event associated with humidity values in inappropriate data ranges for the sensor with the id "AK39P." The error analysis has revealed in this case a single dimension association rule. This rule states that when the sensor id is "AK39P", and that the humidity is with a confidence of 87% in an invalid range. The combination of sensor id "AK39P" and an invalid range for humidity occurred in 17.43% of events.

Because a CEP engine is used to analyze the error events, the analysis results are computed in a live manner. Therefore, they can be directly reported to the administrator. In order to let the administrator concentrate on the most urgent problems, the rendering of the results in the administration tool 220 can be prioritized. This prioritization can be done, for example, with respect to the erroneous streams most often used in queries, the streams producing the most errors in the past hour, the streams most often (indirectly) referenced in user dashboards, and/or the like.

Figure 5:
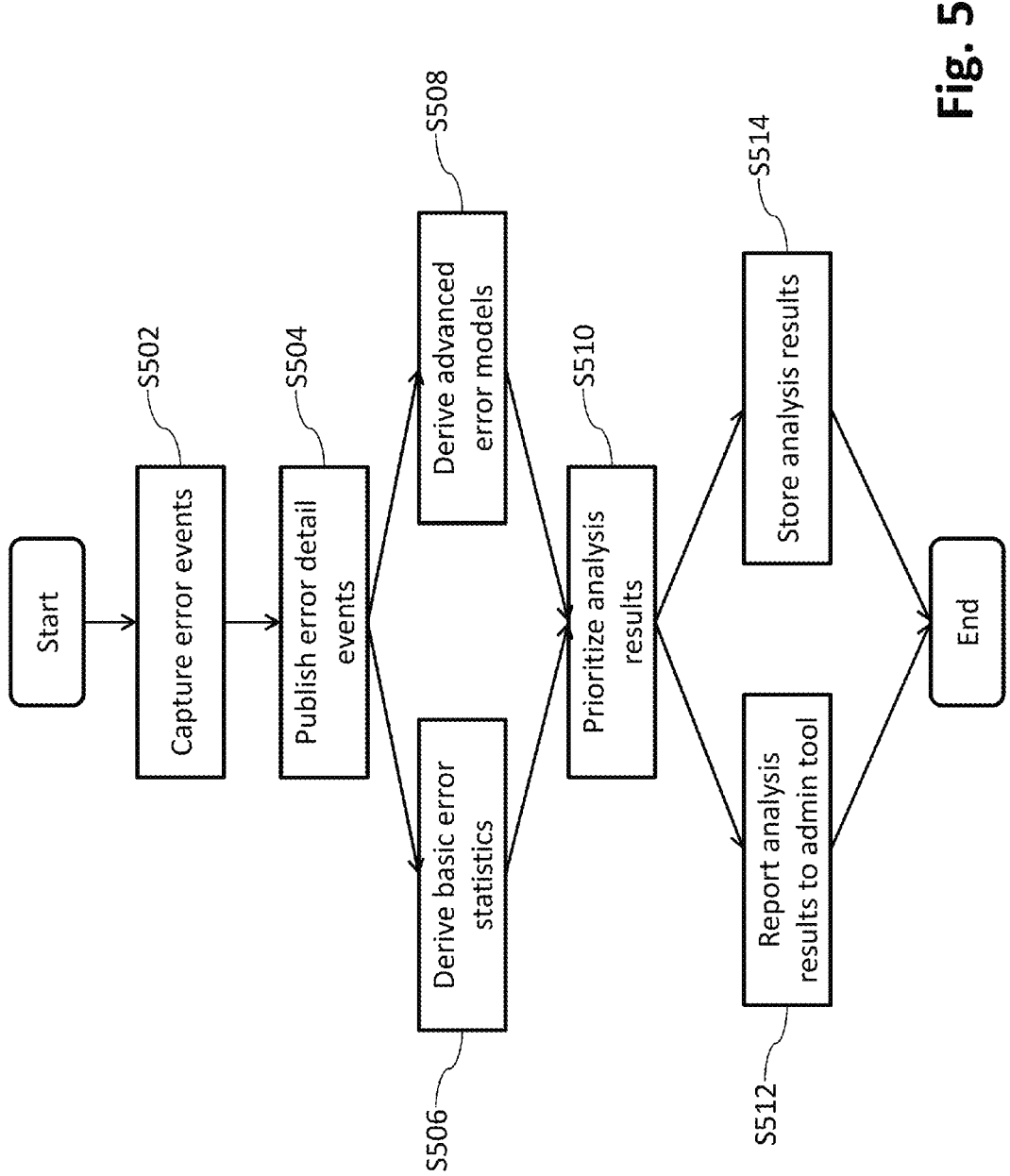
FIG. 5 is a flowchart that illustrates a basic workflow for conducting an error analysis for CEP administrators, according to certain example embodiments.

FIG. 5 is a flowchart that illustrates a basic workflow for conducting an error analysis for CEP administrators, according to certain example embodiments. Live events are captured in step S502, and error detail events are published in step S504. Basic error statistics and advanced error models are derived in steps S506 and S508, respectively. Analysis results are prioritized in step S510, and the results of the analysis are reported to the administrator tool 220 in step S512 and stored for possible further follow-up and/or construction of a knowledge base, etc., in step S514.

As alluded to above, and as described in greater detail below, the error handler 202 may also run an impact analysis for the business user, e.g., in parallel with the analysis detailed above performed for the administrator.

Error Impact Analysis Techniques Assisting the Business User

As indicated above, the business user may have a dashboard or report that helps in visualizing the results of the analysis of the input event streams 206a-206n. These results are computed with continuous CEP queries executed using the CEP engine 212 of the application 208. Additionally, on the dashboard/report layer, the user can adapt the results, e.g. by transforming or further condensing the data. For the sake of simplicity, the term business user application 214 is used in this section to refer to dashboards, reports, and/or other user interface representations that assist in visualizing data. The error handler 202 is able to access that additional logic of the business user application 214. This can be achieved by requesting the currently running business user application logic on demand, by sending notification events describing current adaptations of the business user application logic to the error handler 202, and/or the like. This information is maintained in the dashboard and report catalog 218c of the error handler 202. Additionally, the error handler 202 knows the currently running queries within the original CEP engine 212 of the application 208. Analogously this information can be provided to the Error Handler in the form of notification events.

As described above, errors can occur in the input layer 210a and/or the processing layer 210b of the application 208. Corresponding error detail events are generated and sent to the error handler 202. From such an event, the error handler 202 can determine which queries are affected, e.g., by checking whether the stream is referred to in queries, their follow-up queries, and so on. It then checks each currently active business user application 214 to determine whether it is affected by that error. This can be done by examining whether one or more of the affected queries contribute to the business user application logic. For example, assume that there is a CEP query that continuously computes the average transaction volume per region in the last hour. Assume further that in the business user application 214, the average volume is rounded, the region name is replaced, and then this information is visualized in a pie chart. As a result, the pie chart is affected by an error in the volume stream.

If an error has no effects on the current business user application logic, the business user application 214 need not receive a notification. If an error has an effect on the current business user application logic, the business user application 214 may receive a notification. For that purpose, the applications 214 may be enriched with an error notification component that informs the user of an error. Different options are possible for such a notification component including, for example, the appearance of an icon (e.g., a red blinking icon in the right bottom corner of the business user application 214), a pop-up dialog within the application, a highlighting of business user application 214 components affected by an error, an email or other message being sent, etc.

The business user can select such a notification element in order to obtain more details of the error. The user may be able to choose between different options for handling the error in certain scenarios. A first option is to ignore the error. A second option is to fix the error by modifying the original erroneous event so that it is valid. When dealing with a multitude of errors of the same stream, the user also may be able to select and correct multiple events in one batch. Additionally, or alternatively, the user may be able to define default cleaning actions to be executed when specific errors occur. In that case, the system may automatically execute such cleaning steps. When the events have been corrected, the user may run a what-if analysis. This analysis may involve the rerunning of all corresponding logic (including, for example, CEP logic and business user application logic) over the relevant events, including the corrected ones. As a result of the analysis, the user may be presented with a comparison between the business user application 214 component not including the fixed events and the business user application 214 component including the fixed events. This may allow the business user to more directly pinpoint the differences between the visualizations so that the user can assess whether there is a need or desire to adapt previous decisions. As the user typically does not permanently look at the dashboards, reports, etc., the notifications for at least recent error events may be kept in the business user application 214.

In order to be capable of running a what-if analysis, the error handler 202 may internally maintain a cache of input events 218a. Given the currently running CEP queries, the error handler 202 determines for each stream with which timeframes it is associated in the queries. It selects for each stream the maximum timeframe. The events of the stream are continuously cached for that timeframe. For instance, assume that one query computes the average of the volume stream in the last hour, while another query computes the minimum of that stream in the last three hours. In that case, the error handler 202 would continuously cache the events of the volume stream for the corresponding last three hours. As CEP queries are deregistered and new ones are registered, the error handler 202 updates the cache settings correspondingly for changes of the query set. Given the corrected event and the cache of the stream, the error handler 202 can rerun the affected queries. However, in order to limit the size of the caches required for replaying the events, an additional temporal eviction policy may be leveraged, e.g., to help ensure that the caches do not allocate too much memory. For example, the size of the cache may be reduced by maintaining only a sample of its events. For errors deemed too old, the corresponding replay functionality may be limited.

Depending on the characteristics of the connected input event streams, the number of error events can be high. As a consequence, the business user may receive a multitude of notifications indicating that business user application 214 components were affected by erroneous events. To let the business user concentrate on the most critical problems, the user may configure the handling of errors by assigning priorities to the business user application 214 components. Given these priorities, the error handler 202 may only reports errors to the business user application if they affect a component with a sufficiently high priority. Other errors need not be reported. On the side of the business user application 214, the notification of errors can also be aligned with respect to the priorities. For example, errors with a high priority may be reported with a pop-up dialogue, while errors with low priority may be only added to an error list.

Another option to reduce the number of interactions for the business user is the specification of a threshold for error tolerance. For instance, the system can automatically run the what-if analysis for corrected error events in the background. Then, it may compare the analysis results with the previous analysis results. If the deviations are below a tolerance threshold, then no further action may be deemed needed. However, if it is above the threshold, the comparison of the analysis results and the business user application 214 may be reported to the user.

FIG. 6 is an XML-based representation of an example error impact event that the error handler 202 may send to the business user application 214, according to certain example embodiments. As can be seen from the FIG. 6 example, the average temperature query is involved with an error associated with data being provided in an invalid range for the humidity attribute. The affected components, including "PieChart_3" and "Table_7", are identified. Each affected component has a different priority.

Figure 7:
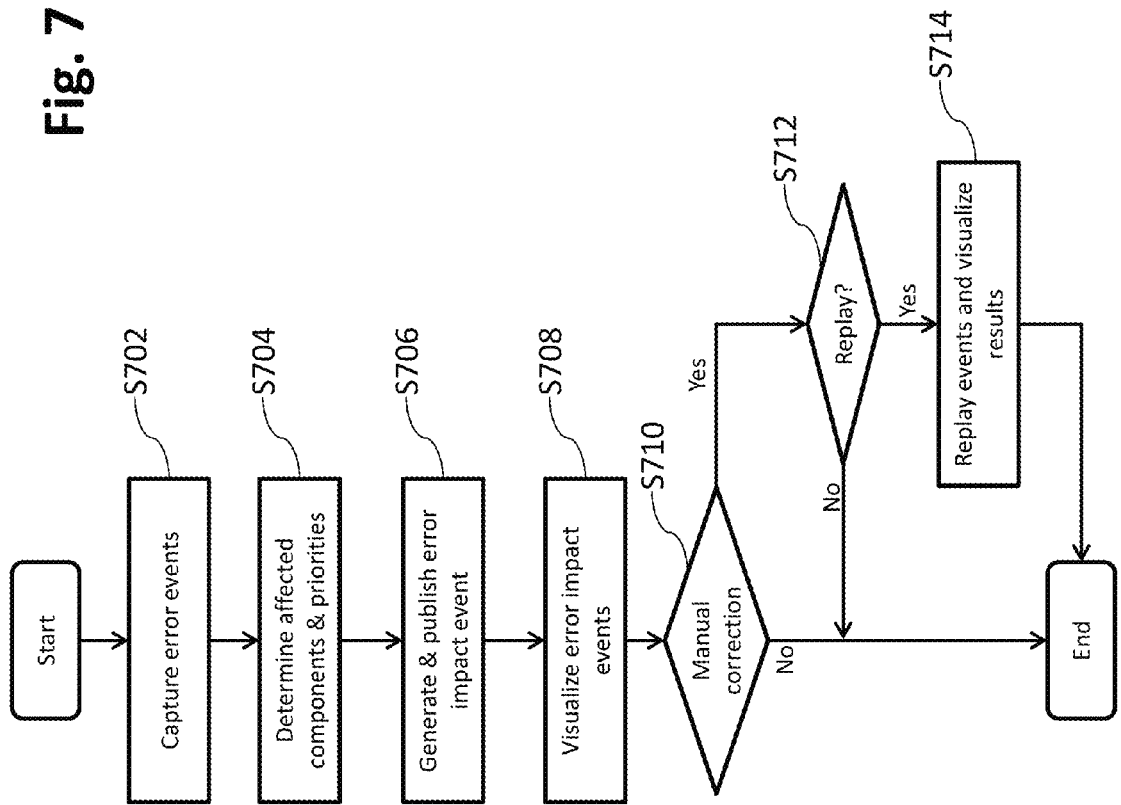
FIG. 7 is a flowchart that illustrates a basic workflow for conducting an error impact analysis for business users, according to certain example embodiments.

FIG. 7 is a flowchart that illustrates a basic workflow for conducting an error impact analysis for business users, according to certain example embodiments. In step S702, error events are captured. In step S704, affected components and priorities are identified. Corresponding error impact events are generated and published in step S706. These error impact events are visualized in step S708, as appropriate (e.g., depending on the priorities). If there is no manual correction in step S710, the process is ended (notwithstanding any automated corrections that might be undertaken and any rerunning that might take place as a result). On the other hand, the user is provided an opportunity to rerun certain queries. If nothing is rerun in step S712, the process is ended (again, notwithstanding any automated corrections that might be undertaken and any rerunning that might take place as a result). If reruns are selected, then the events are rerun and the results are visualized in step S714.

Example Use Case of Error Handling

The following simple example illustrates how both a business user using dashboards fed by a CEP system and a CEP system administrator can benefit from the advanced error handling described herein. Although an example application background is provided, it will be appreciated that different sensors, reactions, SLAs, key performance indicators, application types, etc., may be used in different example embodiments.

The application background of this example involves a fully automated assembly line employed by an automotive supplier. The line produces parts that are supplied to major automotive companies and is the supplier's key revenue driver. Strict service level agreements (SLAs) with the supplied companies make it crucial for the supplier to monitor productivity and quality of the assembly line in a continuous fashion. Delivering the produced parts in the committed timeframe requires production outages to be avoided at best, or at least to be acted on in a timely manner. The company therefore leverages CEP technology to analyze a variety of measurements reported by status-tracking sensors that are directly installed in the assembly line.

Given the sensor readings, the associated CEP application uses several queries to continuously derive key performance indicators (KPIs) on throughput, cycle times, and produced goods, etc., but also on product quality and defective parts.

An assembly line supervisor observes those KPIs with corresponding dashboards. Based on the KPIs and the SLAs, the assembly line supervisor may need to take corrective actions in the assembly line or otherwise inform customers that certain SLAs may be breached. Because of the importance of the monitoring application on meeting the SLAs and hence on revenue, it must be robust with respect to exception scenarios; therefore, the monitoring application utilizes the error handler of certain example embodiments to detect and further analyze such scenarios.

One of the sensors in the assembly line, for instance, measures the height of the produced parts. Corresponding CEP-based computations in the monitoring application assess the parts as either defective or flawless. To meet the SLAs, the line must not produce more than 4% of defective parts in the current margin. A hardware defect in the height sensor, however, causes it to randomly report the height as a negative measurement. This in turn leads to exceptions in the CEP logic for the quality assessment (for example, the computation could involve taking the square root of the height, which involves the imaginary number for negative values and, in at least this application, is meaningless). As a consequence of not handling these errors appropriately, the reject rate is wrongly computed and reaches a value above the critical threshold of 4%.

Leveraging the proposed error handling approach, the assembly line supervisor is not only notified about the exceeded threshold, but a warning inside the supervisor's dashboard window also provides a notification of recent errors. Based on this warning, the supervisor takes several actions. If the error is non-recoverable, the supervisor may inform customers about breaching the SLAs. If, however, the supervisor identifies the error as being recoverable, corrective actions are taken and the assembly line is fixed in a manner that meets the relevant SLAs.

Concretely, the supervisor identifies the given height measurement as the negative value of the expected height and decides to manually correct it to the positive value. The supervisor takes further steps to justify this intervention and, based on the corrections, the latest measurements are replayed as a part of a what-if analysis. This analysis reveals whether the current margin would still breach the SLA, or if it could be delivered on time (and with the appropriate rate of rejects).

Figure 8:
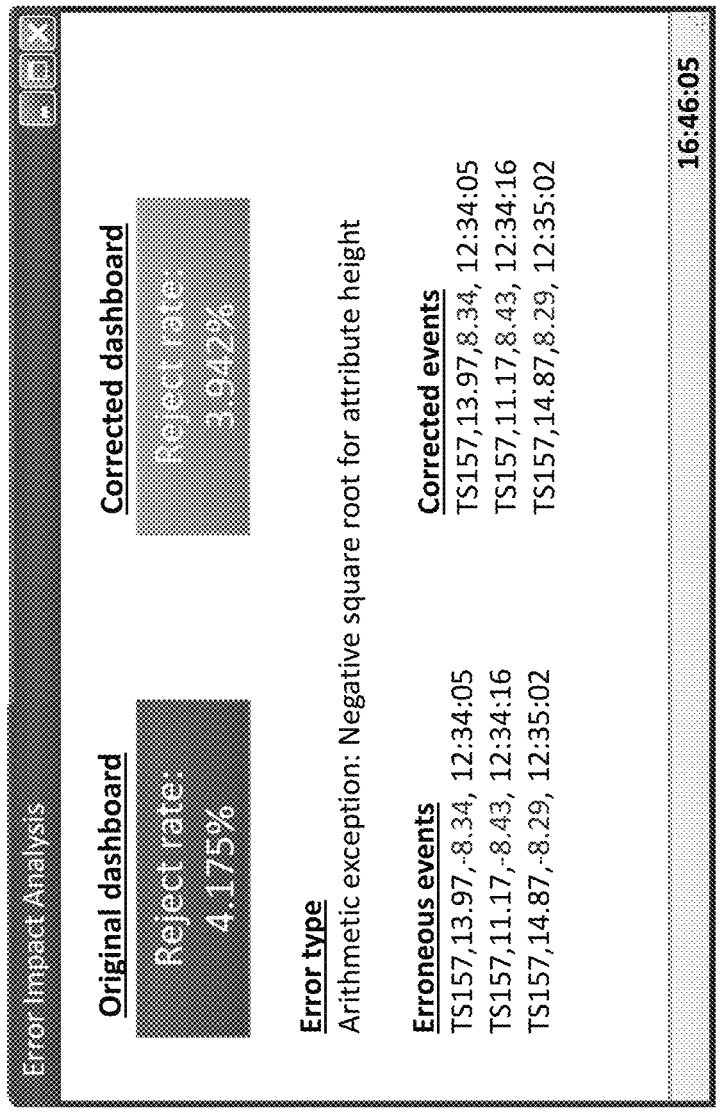
FIG. 8 is a screenshot that shows an example user interface visualizing the results of a what-if evaluation once an error is identified, in accordance with certain example embodiments.

FIG. 8 is a screenshot that shows an example for a corresponding user interface visualizing the results of such an evaluation, in accordance with certain example embodiments. The reject rate is shown in red in the original dashboard view because it is over the 4% limit, and is shown in yellow in the corrected dashboard view because it is approaching the 4% limit. The error type is identified, and data pertaining to the erroneous events is presented, with the incorrect and corrected values being highlighted in red.

Besides the assembly line supervisor who acts as the business user in the given scenario, setting up and maintaining the CEP monitoring application usually also involves system operators or administrators. In the given example scenario, the error handler also informs the system administrator about the erroneous computations in the CEP application. The system administrator starts a root cause analysis using the automatically computed analysis results of the error handler. In that case, the error handler has derived an association rule that identifies with a high probability that it is a defective height sensor producing invalid measurements. The administrator immediately takes corrective actions such as, for example, installing new firmware, replacing the sensor with a new one, etc.

Overall, the additional information provided by the error handler has enabled the assembly line supervisor to react to and circumvent a critical SLA escalation within a narrow timeframe. As a result, no unnecessary charges by the customer become due. Likewise, the system administrator was able to narrow the error down to the failing sensor and to repair the monitoring infrastructure, also in a timely manner.

Example Advantages of Using the Error Handler Disclosed Herein

There are a number of benefits that may result from leveraging the example error handler described herein, e.g., in the context of the sophisticated handling of erroneous events in CEP applications. Some or all of the following and/or other benefits may apply:

Detection and analysis of erroneous events, followed by a tailored processing of the analysis results for CEP administrators as well as business users, as opposed to merely detecting errors and sending a notification.

Support for handling of arbitrary errors in the sense that not only errors on the input source level are handled, but also errors that are thrown while processing CEP queries are handled. Additionally, the handling need not be restricted to a certain class of streaming applications and corresponding errors.

Scalable and extensible design. The error handler of certain example embodiments may be designed to handle errors not only for one CEP engine, but for multiple CEP engines. The internal use of a CEP engine helps ensure that the error handler can easily scale in the number of errors that are to be processed. This approach also complies with the need or desire for in-memory processing, which oftentimes is associated with CEP technology. The lack of a persistency layer in some CEP applications, for example, renders the use of standard error cleaning technology nearly impossible.

Impact analysis for business users. By analyzing the impact of an error and allowing for a prioritized processing, business users can quickly detect relevant error situations and trigger an appropriate counteraction with minimum latency, which can significantly reduce the risk of wrong decisions being made.

Error analysis for CEP administrators. The error handler of certain example embodiments automatically analyzes errors for the administrator, but also offers an interface for defining custom analysis logic in terms of a simple, well-established query language like SQL.

Certain example embodiments may be further extended and/or coupled with other approaches. For example, automatic data cleaning may be triggered by a business user, in certain example embodiments. For instance, in certain example embodiments, the administrator can extend the currently running CEP logic, e.g., by adding additional cleaning steps for erroneous events. Analogously, the business user can specify cleaning steps or the like in the business user application, and such can be automatically translated into CEP queries.

Error handling proposals can be made for other business users, in certain example embodiments. The business user may, for example, specify how to deal with erroneous events. The system can record those reactions, e.g., if other business users have to deal with the same or similar error. If that is the case, the system can provide them with proposals based on previous reactions of other users to the same or similar error. By establishing such a knowledgebase of appropriate actions, the risk of wrong business decisions can be significantly reduced. In a similar vein, a learning mechanism can be put into place so that solutions can be suggested based on the detection of like problems and possible corresponding solutions. The learning mechanism may run its own internal what-if analysis to determine whether a particular candidate solution is likely to resolve the error before making a suggestion.

Extensions can be made to improve the reliability of event sources. For example, in certain example embodiments, the Error Handler can assess the reliability of an event source by evaluating the frequency and impact of erroneous events of that source. This information can be added to the development process of a CEP application so that CEP administrator and business user are aware of potential problems arising with that source in the future.

Further support may be offered for other CEP stakeholders. For instance, in certain example embodiments, the error handler component can be adapted so that other stakeholders of a CEP application, besides business users and administrators, can reap the benefits of an appropriate error handling. This may include, for example, IT architects, business division managers, CEP application developers, CEP consultants, and/or the like.

It will be appreciated that as used herein, the terms system, subsystem, service, engine, module, programmed logic circuitry, and the like may be implemented as any suitable combination of software, hardware, firmware, and/or the like. It also will be appreciated that the storage locations herein may be any suitable combination of disk drive devices, memory locations, solid state drives, CD-ROMs, DVDs, tape backups, storage area network (SAN) systems, and/or any other appropriate tangible non-transitory computer readable storage medium. Cloud and/or distributed storage (e.g., using file sharing means), for instance, also may be used in certain example embodiments. It also will be appreciated that the techniques described herein may be accomplished by having at least one processor execute instructions that may be tangibly stored on a non-transitory computer readable storage medium.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A computing system, comprising:
    processing resources including at least one processor and a memory;
    an event bus configured to receive events from a plurality of external input event sources;
    an application, including input, processing, and output layers, the application being configured to process events received from the event bus, and to provide to the event bus (a) results obtained from processing received events, and (b) error events corresponding to errors detected at the input layer and/or the processing layer; and
    an error handler that, under control of the processing resources, is configured to:
        receive, via the event bus, events from the plurality of external input event sources;
        receive, via the event bus, error events from the application;
        generate, for a given error, an error analysis event and an error impact event by executing a Complex Event Processing (CEP) query on at least a corresponding received error event; and
        provide to the event bus generated error analysis events and generated error impact events,
    wherein generated error analysis events describe for an administrator detailed information analyzing the corresponding errors, and generated error impact events describe for a non-technical user impacts the corresponding errors have for a user application used by the non-technical user, and
    wherein the administrator and the non-technical user are different parties, and wherein generated error analysis events and generated error impact events differ from one another in both structure and content.

2. The system of claim 1, further comprising an administrator tool configured to visualize error analysis events received from the event bus, wherein the user application used by the non-technical user is configured to visualize error impact events received from the event bus.

3. The system of claim 1, further comprising a first CEP engine, wherein the application configured to process events received from the event bus is a CEP application backed by the first CEP engine.

4. The system of claim 3, wherein the error handler includes a second CEP engine that is separate from the first CEP engine, the second CEP engine being configured to facilitate execution of the CEP query in generating error analysis and error impact events.

5. The system of claim 4, wherein the error handler is centralized such that the error handler is configured to receive error events from a plurality of different applications.

6. The system of claim 3, wherein the error handler is configured to share with the application configured to process events received from the event bus such that the first CEP engine is configured to facilitate execution of the CEP query in generating error analysis and error impact events.

7. The system of claim 1, wherein error analysis events include error statistics and/or more complicated derived error models.

8. The system of claim 1, wherein error impact events identify components and/or queries associated with the corresponding error.

9. The system of claim 1, wherein the error handler is further configured to generate query rerun events in response to a request from the non-technical user, the query rerun events providing query results obtained using source events including an event previously associated with an error that has been adjusted.

10. The system of claim 1, wherein the error handler is configured to automatically resolve at least some errors based on user- and/or administrator-defined rules.

11. The system of claim 10, wherein the user- and/or administrator-defined rules previously were manually provided.

12. The system of claim 1, wherein the error handler is configured to automatically resolve at least some errors based on actions taken to resolve errors of the same type.

13. The system of claim 1, wherein the error handler is further configured to assign priorities to generated error analysis events and/or generated error impact events.

14. The system of claim 13, wherein the assigned priorities indicate whether, when, and/or how error messages are to be displayed to the non-technical user and/or the administrator.

15. The system of claim 1, wherein the error events, error analysis events, and error impact events are structured as XML-based documents.

16. A method of handling errors in a computing system, the method comprising, at an error handler under control of processing resources including at least one processor and a memory:
receiving, via an event bus, events from a plurality of input event sources external to the error handler;
receiving, via the event bus, error events from an application that includes input, processing, and output layers, the application being configured to process events received from the event bus, and to provide to the event bus (a) results obtained from processing received events, and (b) error events corresponding to errors detected at the input layer and/or the processing layer;
generating, for a given error, an error analysis event and an error impact event by executing a Complex Event Processing (CEP) query on at least a corresponding received error event; and
providing to the event bus generated error analysis events and generated error impact events,
wherein generated error analysis events describe for an administrator detailed information analyzing the corresponding errors, and generated error impact events describe for a non-technical user impacts the corresponding errors have for a user application used by the non-technical user, and
wherein the administrator and the non-technical user are different parties, and wherein generated error analysis events and generated error impact events differ from one another in both structure and content.

17. The method of claim 16, wherein the non-technical user is a business user.

18. The method of claim 16, wherein the application configured to process events received from the event bus is a CEP application backed by a first CEP engine.

19. The method of claim 18, wherein the error handler includes a second CEP engine that is separate from the first CEP engine, the second CEP engine being configured to facilitate execution of the CEP query in generating error analysis and error impact events.

20. The method of claim 16, wherein error analysis events include error statistics and/or more complicated derived error models and/or error impact events identify components and/or queries associated with the corresponding error.

21. The method of claim 16, further comprising generating query rerun events in response to a request received from the non-technical user, the query rerun events providing query results obtained using source events including an event previously associated with an error that has been adjusted.

22. The method of claim 16, further comprising automatically resolving at least some errors based on predefined rules and/or based on actions taken to resolve errors of the same type.

23. The method of claim 16, wherein errors are resolvable by modifying events associated therewith and rerunning related queries.

24. The method of claim 16, further comprising assigning priorities to generated error analysis events and/or generated error impact events.

25. The method of claim 24, wherein the assigned priorities indicate whether, when, and/or how error messages are to be displayed to the non-technical user and/or the administrator.

26. A non-transitory computer readable storage medium tangibly storing instructions that, when performed by a processor of an error handler in a computing system, execute functionality corresponding to the method of claim 16.

27. An error handler, comprising:
processing resources including at least one processor and a memory; and
a Complex Event Processing (CEP) engine;
wherein the processing resources are configured to control the error handler to at least:
receive, via an event bus, events from a plurality of input event sources external to the error handler;
receive, via the event bus, error events from an application that includes input, processing, and output layers, the application being configured to process events received from the event bus, and to provide to the event bus (a) results obtained from processing received events, and (b) error events corresponding to errors detected at the input layer and/or the processing layer;
generate, for a given error, using the CEP engine, an error analysis event and an error impact event by executing a CEP query on at least a corresponding received error event; and
provide to the event bus generated error analysis events and generated error impact events,
wherein generated error analysis events describe for an administrator detailed information analyzing the corresponding errors, and generated error impact events describe for a non-technical user impacts the corresponding errors have for a user application used by the non-technical user, and
wherein the administrator and the non-technical user are different parties, and wherein generated error analysis events and generated error impact events differ from one another in both structure and content.

* * * * *